(12) United States Patent
Kakishima et al.

(10) Patent No.: US 12,200,530 B2
(45) Date of Patent: Jan. 14, 2025

(54) TERMINAL AND MEASUREMENT METHOD

(71) Applicant: NTT DOCOMO, INC., Tokyo (JP)

(72) Inventors: Yuichi Kakishima, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 320 days.

(21) Appl. No.: 17/768,418

(22) PCT Filed: Oct. 15, 2020

(86) PCT No.: PCT/JP2020/038980
§ 371 (c)(1),
(2) Date: Apr. 12, 2022

(87) PCT Pub. No.: WO2021/075513
PCT Pub. Date: Apr. 22, 2021

(65) Prior Publication Data
US 2023/0300650 A1    Sep. 21, 2023

(30) Foreign Application Priority Data
Oct. 16, 2019   (JP) .................................. 2019-189518

(51) Int. Cl.
*H04W 24/10*    (2009.01)
*H04B 17/336*   (2015.01)
*H04W 56/00*    (2009.01)

(52) U.S. Cl.
CPC .......... *H04W 24/10* (2013.01); *H04B 17/336* (2015.01); *H04W 56/0015* (2013.01)

(58) Field of Classification Search
CPC . H04W 24/10; H04W 56/0015; H04B 17/336
See application file for complete search history.

(56) References Cited

U.S. PATENT DOCUMENTS

2020/0351790 A1\*  11/2020  Hsieh ................ H04W 52/0245
2021/0092624 A1\*   3/2021  Ryu .......................... H04W 72/23

OTHER PUBLICATIONS

Extended European Search Report issued in counterpart European Patent Application No. 20877036.2, mailed on Nov. 10, 2023 (9 pages).
Huawei, HiSilicon; "Discussion on L1-SINR measurements for NR eMIMO"; 3GPP TSG-RAN WG4 Meeting #92bis, R4-1911919; Chongqing, China; Oct. 14-18, 2019 (4 pages).

(Continued)

*Primary Examiner* — Derrick V Rose
(74) *Attorney, Agent, or Firm* — Osha Bergman Watanabe & Burton LLP

(57) ABSTRACT

A terminal includes a receiving unit that receives a block and a reference signal that is for measuring a channel state, wherein the block includes a synchronization signal and system information; and a control unit that measures L1-SINR (Layer1 Signal to interference plus noise power ratio) based on the block including the synchronization signal and the system information, the reference signal for measuring the channel state, and measurement using a resource for measuring interference, wherein the control unit determines a period of measurement of the L1-SINR based on a configuration of the resource for measuring the interference.

3 Claims, 7 Drawing Sheets

(56) References Cited

OTHER PUBLICATIONS

International Search Report issued in PCT/JP2020/038980 on Jan. 19, 2021 (5 pages).
Written Opinion of the International Searching Authority issued in PCT/JP2020/038980 on Jan. 19, 2021 (4 pages).
NTT Docomo, Inc.; "Discussion on multi-beam enhancement"; 3GPP TSG RAN WG1 #98, R1-1909202; Prague, CZ; Aug. 26-30, 2019 (15 pages).
Huawei, HiSilicon; "Further discussion on L1-SINR measurement requirement for NR eMIMO"; 3GPP TSG-RAN WG4 Meeting #93, R4-1914834; Reno, Nevada, USA; Nov. 18-22, 2019 (3 pages).
NTT Docomo, Inc.; "RRM core requirements on L1-SINR"; 3GPP TSG-RAN WG4 Meeting #93, R4-1913568; Reno, USA; Nov. 18-22, 2019 (3 pages).
3GPP TS 38.133 V15.7.0; "3rd Generation Partnership Project; Technical Specification Group Radio Access Network; NR; Requirements for support of radio resource management (Release 15)"; Sep. 2019 (15 pages).
3GPP TS 38.300 V15.7.0; "3rd Generation Partnership Project; Technical Specification Group Radio Access Network; NR; NR and NG-RAN Overall Description; Stage 2 (Release 15)"; Sep. 2019 (99 pages).

\* cited by examiner

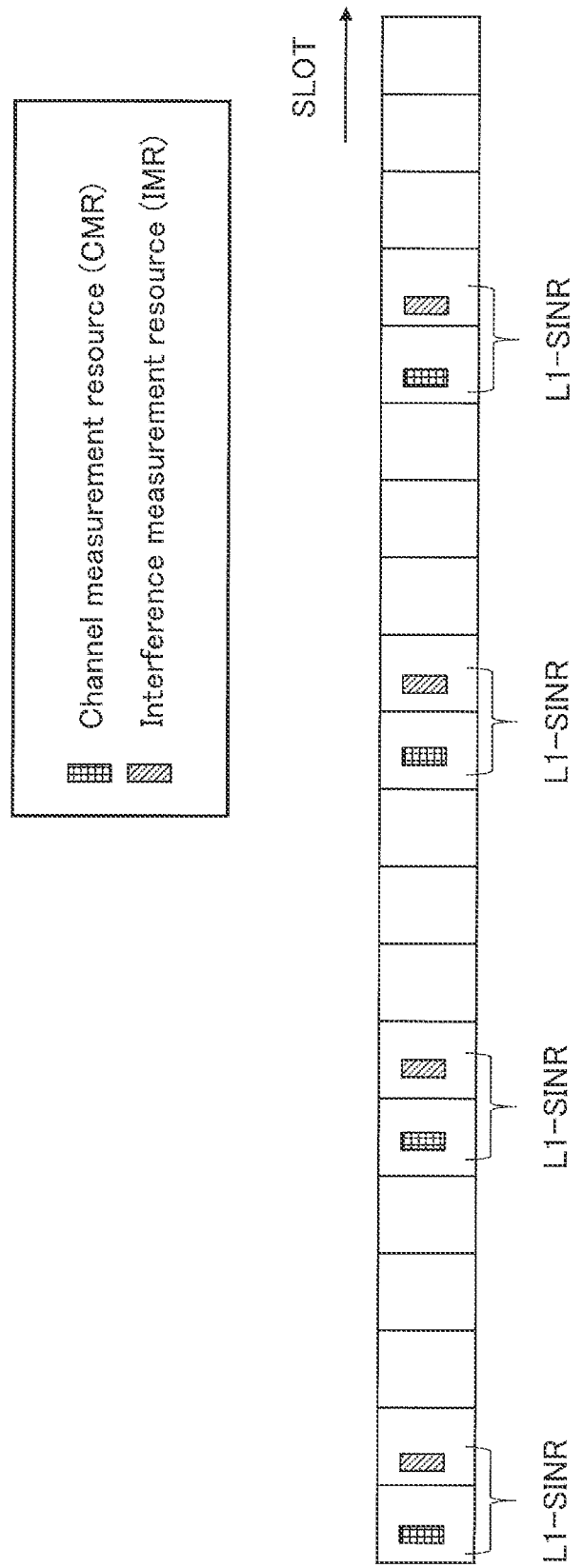

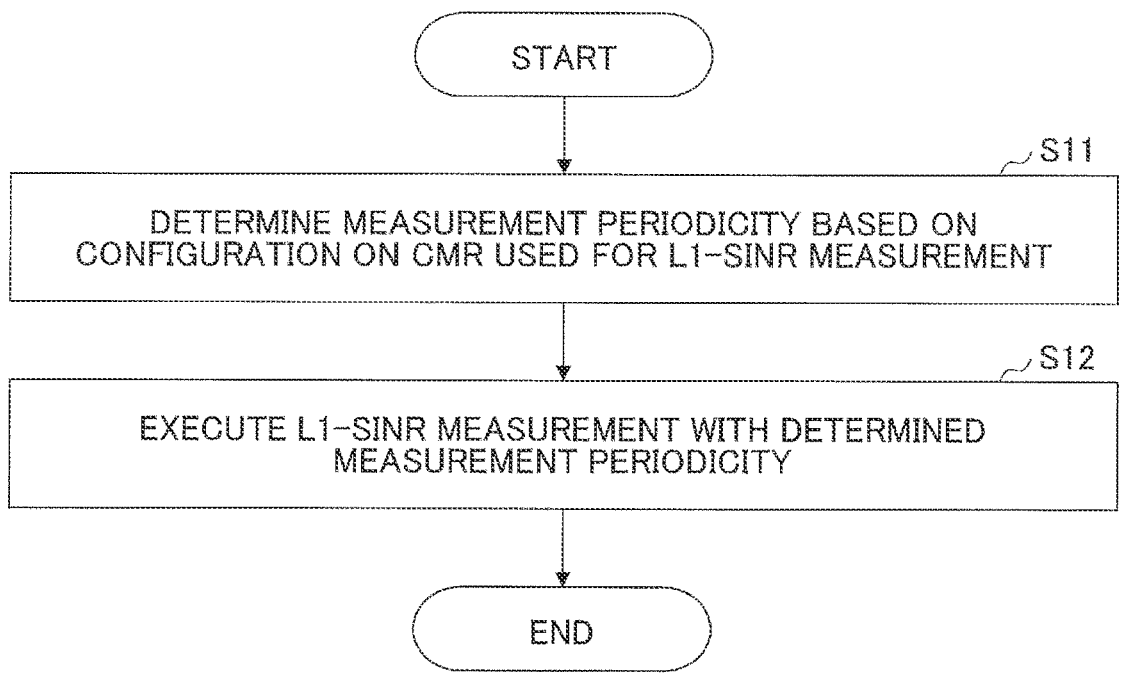
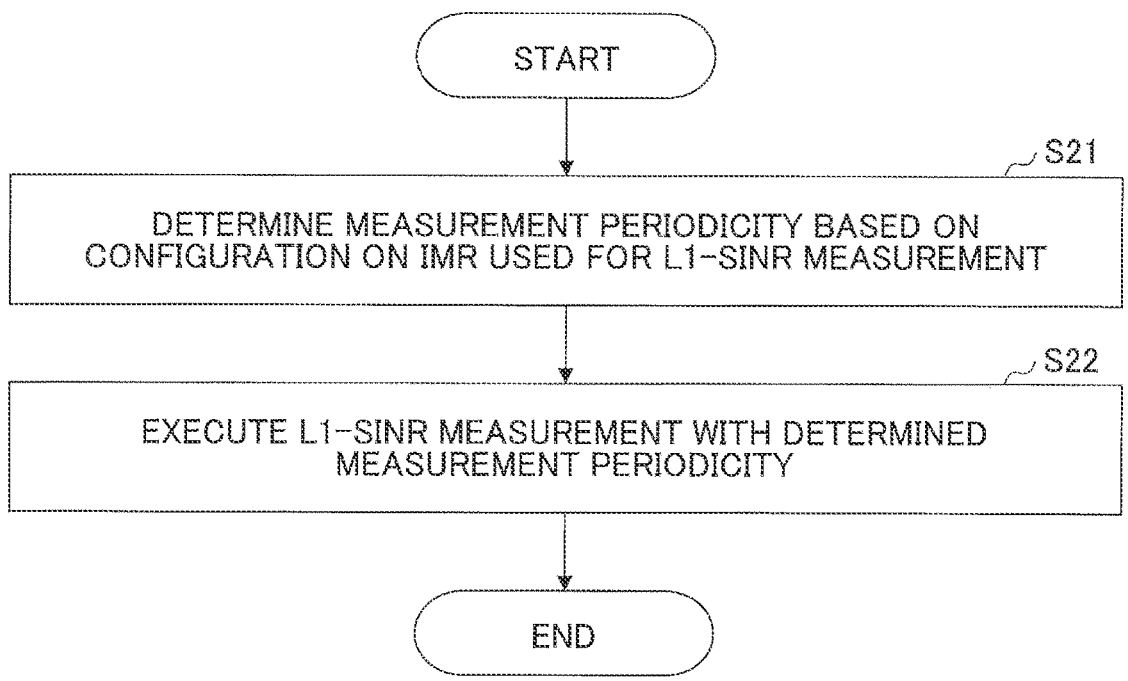

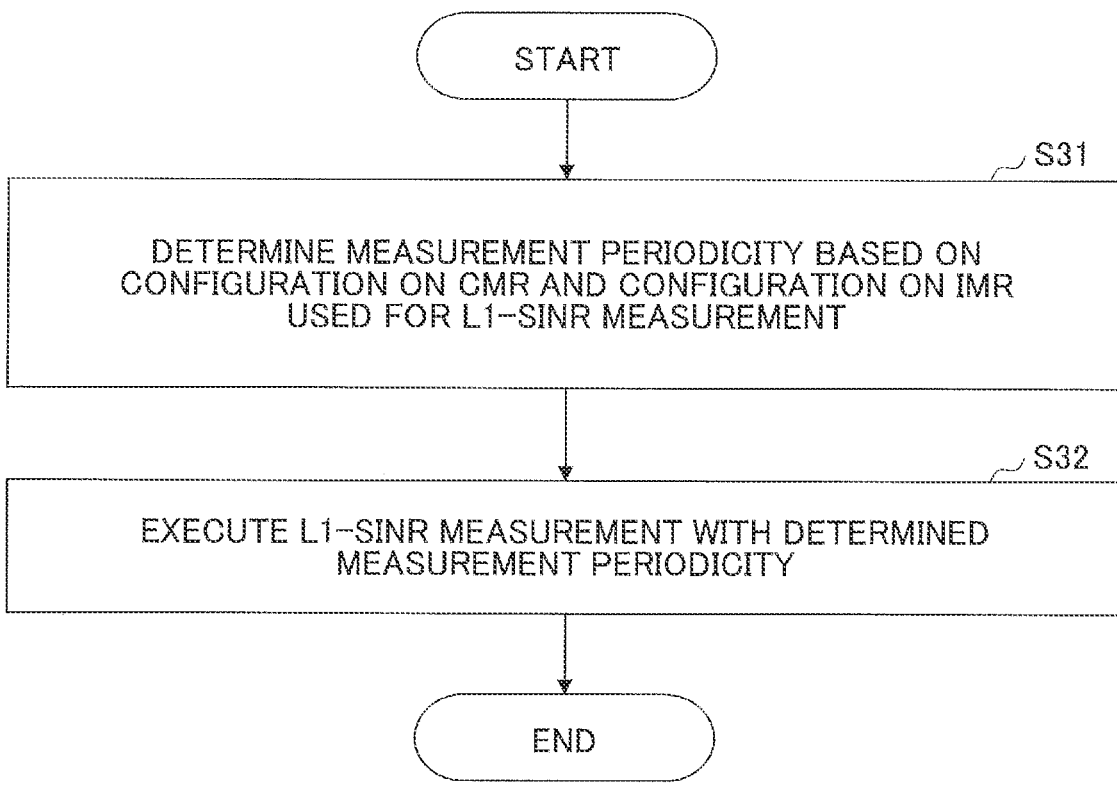

TERMINAL AND MEASUREMENT METHOD

TECHNICAL FIELD

The present invention relates to a terminal and a measurement method in a radio communication system.

BACKGROUND ART

For New Radio (NR) (which is also referred to as "5G") that is a successor system to Long Term Evolution (LTE), technology has been studied that meets requirements, such as those of large capacity system, a high data transmission rate, low latency, simultaneous connection of multiple terminals, low cost, and power saving (e.g., Non-Patent Document 1).

For NR Release 16, functional enhancement on beam management has been studied. It is expected that measurement of L1-SINR (Layer1 Signal to interference plus noise power ratio) is introduced, as one of functions of beam management. As for a layer 1 measurement, measurement of L1-RSRP (Layer1 Reference signal received power) has been introduced in NR Release 15 (e.g., Non-Patent Document 2).

RELATED ART DOCUMENT

Non-Patent Document

Non-Patent Document 1: 3GPP TS 38.300 V15.7.0 (2019-09)
Non-Patent Document 2: 3GPP TS 38.133 V15.7.0 (2019-09)

SUMMARY OF THE INVENTION

Problem to be Solved by the Invention

For L1-SINR measurement, in addition to a Channel measurement resource (CMR) that is a resource for channel measurement used in measurement of L1-RSRP, an Interference measurement resource (IMR) can be used that is a resource for interference measurement. As for an L1-SINR measurement period, it is necessary to consider a period of a CMR and a period of an IMR so as to ensure measurement accuracy. Accordingly, an L1-SINR measurement period is preferably specified separately from an L1-RSRP measurement period.

The present invention has been accomplished in view of the above-described point, and an object is to specify a measurement period for ensuring measurement accuracy in a radio communication system.

Means for Solving the Problem

According to the disclosed technology, there is provided a terminal including a receiving unit that receives a block and a reference signal that is for measuring a channel state, wherein the block includes a synchronization signal and system information; and a control unit that measures L1-SINR (Layer1 Signal to interference plus noise power ratio) based on the block including the synchronization signal and the system information, the reference signal for measuring the channel state, and measurement using a resource for measuring interference, wherein the control unit determines a period of measurement of the L1-SINR based on a configuration of the resource for measuring the interference.

Advantage of the Invention

According to the disclosed technology, a measurement period for ensuring measurement accuracy can be specified in a radio communication system.

BRIEF DESCRIPTION OF DRAWINGS

FIG. 3 is a diagram illustrating an example (2) of measurement according to an embodiment of the present invention.

FIG. 4 is a flowchart for illustrating the example (1) of the measurement according to an embodiment of the present invention.

FIG. 5 is a flowchart for illustrating the example (2) of the measurement according to an embodiment of the present invention.

FIG. 6 is a flowchart for illustrating an example (3) of measurement according to an embodiment of the present invention.

EMBODIMENTS OF THE INVENTION

Figure 1:
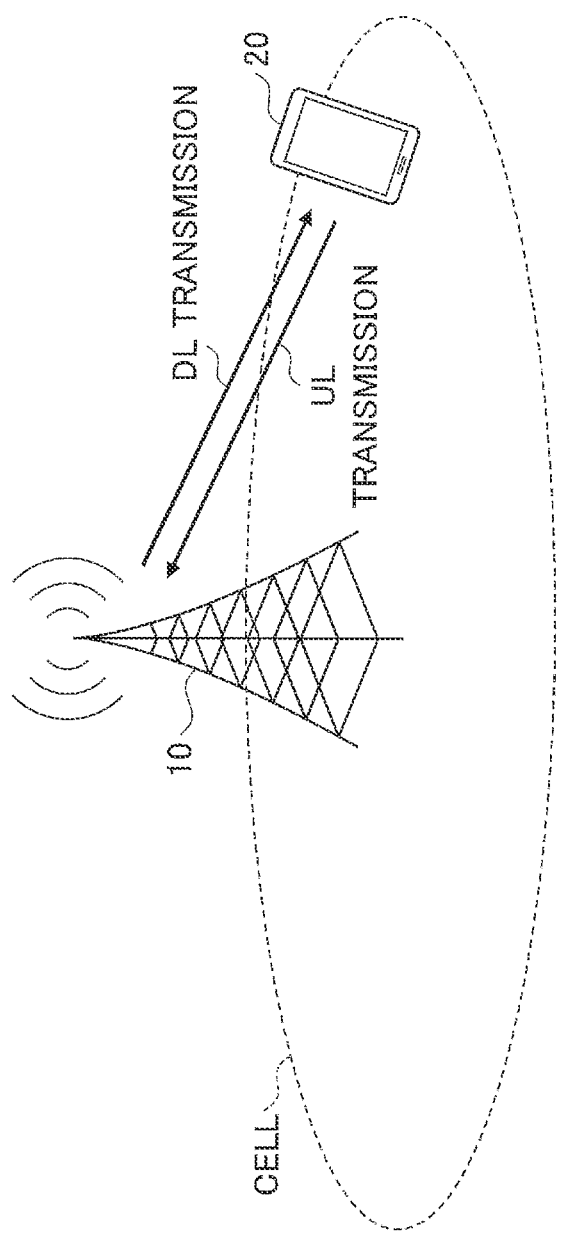
FIG. 1 is a diagram illustrating an example of a configuration of a radio communication system according to an embodiment of the present invention.

In the following, embodiments of the present invention are described by referring to the drawings. The embodiments described below are merely examples, and embodiments to which the present invention is applied are not limited to the embodiments described below.

In operating a radio communication system according to an embodiment of the present invention, existing technology is used as appropriate. Here, the existing technology is, for example, the existing LTE. However, the existing technology is not limited to the existing LTE. The term "LTE" as used in this specification has a broad meaning including LTE-Advanced and a scheme subsequent to LTE-Advanced (e.g., NR), unless as otherwise specified.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channel (PUCCH), Physical Uplink Shared Channel (PUSCH), etc. This is for convenience of description, and signals, functions, etc., similar to these may be referred to by other names. The above-described terms in NR correspond to NR-SS, NR- PSS, NR-SSS, NR-PBCH, NR-PRACH, etc., respectively. However, even if a signal is used for NR, the signal is not always specified as "NR-."

In the embodiments of the present invention, a duplex method may be a Time Division Duplex (TDD) method, a Frequency Division Duplex (FDD) method, or any other method (e.g., Flexible Duplex).

In the embodiments of the present invention, "configuring" a radio parameter, etc., may be "pre-configuring" a predetermined value, or configuring a radio parameter notified from a base station 10 or a terminal 20.

FIG. 1 is a diagram illustrating an example of a configuration of a radio communication system according to an embodiment of the present invention. As illustrated in FIG. 1, the radio communication system according to the embodiment of the present invention includes a base station 10 and a terminal 20. In FIG. 1, one base station 10 and one terminal 20 are illustrated. However, this is an example, and there may be a plurality of base stations 10 and a plurality of terminals 20.

The base station 10 provides one or more cells, and the base station 10 is a communication device for performing radio communication with the terminal 20. A physical resource of a radio signal may be defined in a time domain and a frequency domain, the time domain may be defined in terms of a number of Orthogonal Frequency Division Multiplexing (OFDM) symbols, and the frequency domain may be defined in terms of a number of subcarriers or a number of resource blocks. The base station 10 transmits a synchronization signal and system information to the terminal 20. The synchronization signal is, for example, NR-PSS and NR-SSS. The system information is transmitted, for example, on a NR-PBCH, and the system information is also referred to as broadcast information. The synchronization signal and the system information may be referred to as an SS/PBCH block (SSB). As illustrated in FIG. 1, the base station 10 transmits a control signal or data to the terminal 20 on Downlink (DL), and the base station 10 receives a control signal or data from the terminal 20 on Uplink (UL). Each of the base station 10 and the terminal 20 can perform beamforming to transmit and receive signals. Furthermore, the base station 10 and the terminal 20 can apply Multiple Input Multiple Output (MIMO) based communication to DL or UL. Furthermore, the base station 10 and the terminal 20 may perform communication through a secondary cell (SCell: Secondary Cell) and a primary cell (PCell: Primary Cell) that are configured based on Carrier Aggregation (CA). Furthermore, the terminal 20 may perform communication through a primary cell of the base station 10 and a primary secondary cell (PSCell: Primary Secondary Cell) of another base station 10 that are configured based on Dual Connectivity (DC).

The terminal 20 is a communication device provided with a radio communication function, such as a smartphone, a cellular phone, a tablet, a wearable terminal, a communication module for Machine-to-Machine (M2M), etc. As illustrated in FIG. 1, the terminal 20 utilizes various communication services provided by a radio communication system by receiving control signals or data in DL from the base station 10 and transmitting control signals or data in UL to the base station 10.

For NR Release 16, functional enhancement on beam management has been studied. It is expected that measurement of Layer1 Signal to interference plus noise power ratio (L1-SINR) is introduced, as one of functions of beam management. As for a layer 1 measurement, measurement of Layer1 Reference signal received power (L1-RSRP) has been introduced in NR Release 15.

For L1-SINR measurement, in addition to a Channel measurement resource (CMR) that is a resource for channel measurement used in measurement of L1-RSRP, an Interference measurement resource (IMR) that is a resource for interference measurement can be used. As for an L1-SINR measurement period, it is necessary to consider a period of a CMR and a period of an IMR so as to ensure measurement accuracy. Accordingly, an L1-SINR measurement period is preferably specified separately from an L1-RSRP measurement period. Thus, an operation on the L1-SINR measurement is specified separately from that of L1-RSRP.

For measuring L1-SINR, the base station 10 may make a resource configuration and a report configuration by Radio Resource Control (RRC) signaling to the terminal 20, as described in 1) and 2) below.

1) An SSB resource and a Channel State Information-Reference Signal (CSI-RS) resource may be configured. An SSB and a CSI-RS used for an L1-SINR report may be specified by RRC signalling. An information element of the RRC signalling may be, for example, L1SINR-ResourceConfig. The terminal 20 may measure a value of L1-SINR for each reference signal configured by the RRC signalling. Each reference signal may correspond to a beam transmitted by the base station 10. For the CSI-RS, a periodic CSI-RS, a semi-persistent CSI-RS, and an aperiodic CSI-RS can be configured, as a CSI-RS configuration. The semi-persistent CSI-RS or the aperiodic CSI-RS may be activated or triggered by a Media Access Control-Control Element (MAC-CE) or Downlink Control Information (DCI).

2) A reporting configuration may be made. A type of L1-SINR reporting, a number of reference signals to be reported, etc., may be specified by RRC signalling. An information element of the RRC signalling may be, for example, L1SINR-ReportConfig. As a type of reporting, periodic reporting, semi-persistent reporting, and aperiodic reporting may be configured. The periodic reporting, the semi-persistent reporting, and the aperiodic reporting may be activated or triggered by a MAC-CE or DCI.

Table 1 indicates a CSI-RS configuration that can be configured for each type of CSI reporting. As described in 21 above, each type of CSI reporting may be applied to L1-SINR reporting in which measurement is similarly performed using a CSI-RS.

TABLE 1

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on | Triggered by DCI; additionally, activation command [10, TS 38.321] possible as defined in Subclause |

TABLE 1-continued

| CSI-RS Configuration | Periodic CSI Reporting | Semi-Persistent CSI Reporting | Aperiodic CSI Reporting |
|---|---|---|---|
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

As indicated in Table 1, in the periodic CSI reporting, a periodic CSI-RS does not support dynamic triggering or activation, and the periodic CSI-RS does not support the semi-persistent CSI-RS and the aperiodic CSI-RS. Furthermore, as indicated in Table 1, in the semi-persistent CSI reporting, a periodic CSI-RS and a semi-persistent CSI-RS are triggered by DCI, reporting is on a PUSCH, and the semi-persistent CSI reporting does not support an aperiodic CSI-RS. In the aperiodic CSI reporting, a periodic CSI-RS, a semi-persistent CSI-RS, and an aperiodic CSI-RS are triggered by DCI, and reporting is on a PUSCH.

A measurement period of L1-SINR may specify, for each report, a number of most recent samples within which L1-SINR measurement is required to be completed. For example, the measurement period of L1-SINR may be defined to be M×P×SSB or a period of a CSI-RS in Frequency Range 1 (FR1), and the measurement period of L1-SINR may be defined to be M×N×P×SSB or a period of a CSI-RS in FR2, where "M" is a number of samples used for measurement of the L1-SINR reporting, "P" is a scaling factor considering an overlap with an SS block based RRM measurement timing configuration (SMTC) or a Measurement gap (MG), and "N" is a scaling factor considering reception beam switching of the terminal 20.

Table 2 is a table indicating an example of a setting of the number of samples M.

TABLE 2

| condition | number of samples |
|---|---|
| a case in which timeRestrictionForChannelMeasuremt is configured, or a case of aperiodic CSI-RS | M = 1 |
| other than the above-described case | M = 3 ※it is up to UE as to whether to apply averaging for three samples |

As indicated in Table 2, in a case in which an information element timeRestrictionForChannelMeasurement is configured, or a case of an aperiodic CSI-RS, M may be 1 (M=1). In a case other than the above-described cases, M may be 3 (M=3), and it may depend on implementation of the terminal 20.

Table 3 is a table indicating an example of setting of the scaling factor N.

TABLE 3

| condition | scaling factor associated with UE reception beam switching |
|---|---|
| CSI-RS based reporting | N = 1 |
| SSB based reporting | N = 8 |
| CSI-RS with repetition ON, and number of CSI-RS resources < maxNumberRxBeam | ceil(maxNumberRxBeam/ number of CSI-RS resources) |

As indicated in Table 3, for CSI-RS based reporting, N may be 1 (N=1). Furthermore, for SSB based reporting, N may be 8 (N=8). Furthermore, when the repetition of the CSI-RS is enabled, and a number of CSI-RS resources is less than a number of reception beams supported by the terminal 20, N may be ceil((a number of reception beams)/(a number of CSI-RS resources)).

A period of L1-SINR measurement using an SSB in FR1 may be specified depending on a Discontinuous reception (DRX) mode as indicated in Table 4. Note that $T_{SSB}$ is a period of an SSB associated with an SSB index configured for L1-SINR. $T_{DRX}$ is a DRX cycle length. $T_{Report}$ is configured periodicity for reporting.

TABLE 4

| Configuration | $T_{L1\text{-}SINR\_Measurement\_Period\_SSB}$ (ms) |
|---|---|
| non-DRX | max($T_{Report}$, ceil(M * P) * $T_{SSB}$) |
| DRX cycle ≤ 320 ms | max($T_{Report}$, ceil(1.5 * M * P) * max($T_{DRX}$, $T_{SSB}$)) |
| DRX cycle > 320 ms | ceil(M * P) * $T_{DRX}$ |

Note:
$T_{SSB}$ = ssb-periodicityServingCell is the periodicity of the SSB-Index configured for L1-SINR measurement. $T_{DRX}$ is the DRX cycle length. $T_{Report}$ is configured periodicity for reporting.

As indicated in Table 4, for a non-DRK mode, an L1-SINR measurement period $T_{L1\text{-}SINR\_Measurement\_Period\_SSB}$ may be max ($T_{Report}$, ceil(M*P)*$T_{SSB}$). If the DRX cycle is less than or equal to 320 ms, $T_{L1\text{-}SINR\_Measurement\_Period\_SSB}$ may be max ($T_{Report}$, ceil(1.5*M*P)*max($T_{DRX}$, $T_{SSB}$)). If the DRX cycle is greater than 320 ms, $T_{L1\text{-}SINR\_Measurement\_Period\_SSB}$ may be ceil(M*P)*$T_{DRX}$.

As indicated in Table 5, a period of L1-SINR measurement using a CSI-RS in FR1 may be specified depending on a DRX mode. Note that $T_{CSI\text{-}RS}$ is periodicity of the CSI-RS configured for the L1-SINR measurement. $T_{DRX}$ is the DRX cycle length. $T_{Report}$ is configured periodicity for reporting. Furthermore, for example, the configuration of the measurement period indicated in Table 5 may be applied to a case in which density of a CSI-RS resource configured for L1-SINR measurement is 3.

TABLE 5

| Configuration | $T_{L1\text{-}SINR\_Measurement\_Period\_CSI\text{-}RS}$ (ms) |
|---|---|
| non-DRX | max($T_{Report}$, ceil(M * P) * $T_{CSI\text{-}RS}$) |
| DRX cycle ≤ 320 ms | max($T_{Report}$, ceil(1.5 * M * P) * max($T_{DRX}$, $T_{CSI\text{-}RS}$)) |
| DRX cycle > 320 ms | ceil(M * P) * $T_{DRX}$ |

Note 1:
$T_{CSI\text{-}RS}$ is the periodicity of CSI-RS configured for L1-SINR measurement. $T_{DRX}$ is the DRX cycle length. $T_{Report}$ is configured periodicity for reporting,
Note 2:
the requirements are applicable provided that the CSI-RS resource configured for L1-SINR measurement is transmitted with Density = 3.

As indicated in Table 5, for a non-DRX mode, an L1-SINR measurement period $T_{L1\text{-}SINR\_Measurement\_Period\_CSI\text{-}RS}$ may be max ($T_{Report}$, ceil(M*P)*$T_{CSI\text{-}RS}$). If the DRX cycle is less than or equal to 320 ms, $T_{L1\text{-}SINR\_Measurement\_Period\_CSI\text{-}RS}$ may be max ($T_{Report}$, ceil(1.5*M*P)*max($T_{DRX}$, $T_{CSI\text{-}RS}$)). If the DRX cycle is greater than 320 ms, $T_{L1\text{-}SINR\_Measurement\_Period\_CSI\text{-}RS}$ may be ceil(M*P)*$T_{DRX}$.

A period of L1-SINR measurement using an SSB in FR2 may be specified depending on a DRX mode as indicated in Table 6. Note that $T_{SSB}$ is a period of an SSB associated with an SSB index configured for L1-SINR. $T_{DRX}$ is a DRX cycle length. $T_{Report}$ is configured periodicity for reporting.

TABLE 6

| Configuration | $T_{L1\text{-}SINR\_Measurement\_Period\_SSB}$ (ms) |
|---|---|
| non-DRX | max($T_{Report}$, ceil(M * P * N) * $T_{SSB}$) |
| DRX cycle ≤ 320 ms | max($T_{Report}$, ceil(1.5(1.5 * M * P * N) * max($T_{DRX}$, $T_{SSB}$)) |
| DRX cycle > 320 ms | ceil(1.5 * M * P * N) * $T_{DRX}$ |

Note:
$T_{SSB}$ = ssb-periodicityServingCell is the periodicity of the SSB-Index configured for L1-SINR measurement. $T_{DRX}$ is the DRX cycle length. $T_{Report}$ is configured periodicity for reporting.

As indicated in Table 6, for a non-DRX mode, an L1-SINR measurement period $T_{L1\text{-}SINR\_Measurement\_Period\_SSB}$ may be max ($T_{Report}$, ceil(M*P*N)*$T_{SSB}$). If the DRX cycle is less than or equal to 320 ms, $T_{L1\text{-}SINR\_Measurement\_Period\_SSB}$ may be max ($T_{Report}$, ceil(1.5*M*P*N)*max($T_{DRX}$, $T_{SSB}$)). If the DRX cycle is greater than 320 ms, $T_{L1\text{-}SINR\_Measurement\_Period\_SSB}$ may be ceil(1.5*M*P*N)*$T_{DRX}$.

As indicated in Table 7, a period of L1-SINR measurement using a CSI-RS in FR2 may be specified depending on a DRX mode. Note that $T_{CSI\text{-}RS}$ is periodicity of the CSI-RS configured for the L1-SINR measurement. $T_{DRX}$ is the DRX cycle length. $T_{Report}$ is configured periodicity for reporting. Furthermore, for example, the configuration of the measurement period indicated in Table 7 may be applied to a case in which density of a CSI-RS resource configured for L1-SINR measurement is 3.

TABLE 7

| Configuration | $T_{L1\text{-}SINR\_Measurement\_Period\_CSI\text{-}RS}$ (ms) |
|---|---|
| non-DRX | max($T_{Report}$, ceil(M * P * N) * $T_{CSI\text{-}RS}$) |
| DRX cycle ≤ 320 ms | max($T_{Report}$, ceil(1.5 * M * P * N) * max($T_{DRX}$, $T_{CSI\text{-}RS}$)) |
| DRX cycle > 320 ms | ceil(M * P * N) * $T_{DRX}$ |

Note 1:
$T_{CSI\text{-}RS}$ is the periodicity of CSI-RS configured for L1-SINR measurement. $T_{DRX}$ is the DRX cycle length. $T_{Report}$ is configured periodicity for reporting.
Note 2:
the requirements are applicable provided that the CSI-RS resource configured for L1-SINR measurement is transmitted with Density = 3.

As indicated in Table 7, for a non-DRX mode, an L1-SINR measurement period $T_{L1\text{-}SINR\_Measurement\_Period\_CSI\text{-}RS}$ may be max ($T_{Report}$, ceil (M*P*N)*$T_{CSI\text{-}RS}$). If the DRX cycle is less than or equal to 320 ms, $T_{L1\text{-}SINR\_Measurement\_Period\_CSI\text{-}RS}$ may be max ($T_{Report}$, ceil(1.5*M*P*N)*max($T_{DRX}$, $T_{CSI\text{-}RS}$)). If the DRX cycle is greater than 320 ms, $T_{L1\text{-}SINR\_Measurement\_Period\_CSI\text{-}RS}$ may be ceil(M*P*N)*$T_{DRX}$.

Furthermore, measurement accuracy of L1-SINR may be specified. As to whether to apply L1 averaging may depend on implementation of the terminal 20. When an information element timeRestrictionForChannelMeasurements is configured, the terminal 20 may report a result of measurement on one sample, without averaging.

As for L1-SINR reporting, a number of reference signals to be reported may be specified by an information element nrofReportedRS. Furthermore, a number of reference signals to be reported may be less than or equal to N_max. For N_max, 2 or 4 may be set depending on UE capability.

If nrofReportedRS=1, the terminal 20 may report L1-SINR based on a mapping table representing correspondence between a measurement report and a report value. If nrofReportedRS is greater than 1, or if groupBasedBeamReporting is activated, a maximum value may be reported based on a mapping table, and another value may be reported as a difference from the maximum value.

An L1-SINR resource that can be configured may be separately configured from a reference signal to be reported, or an L1-SINR resource that can be configured may be individually configured for the terminal 20.

Figure 2:
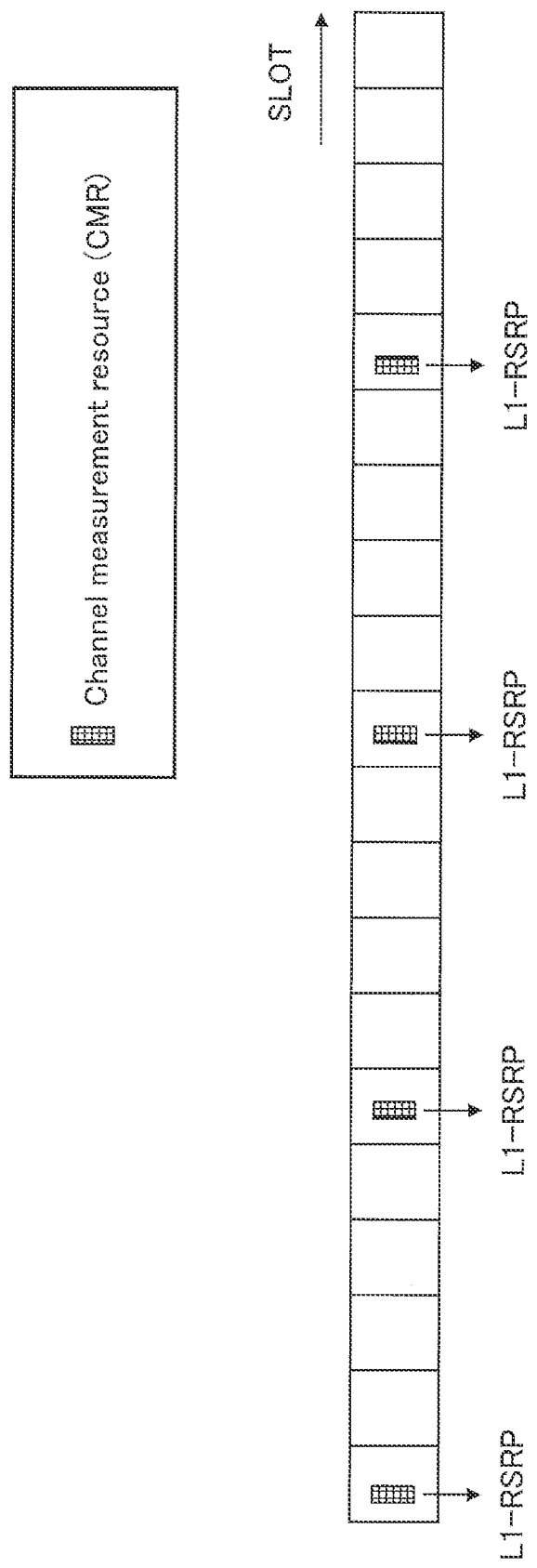
FIG. 2 is a diagram illustrating an example (1) of measurement according to an embodiment of the present invention.

FIG. 2 is a diagram illustrating an example (1) of measurement according to an embodiment of the present invention. A measurement time interval is configured for L1-SINR. The terminal 20 is required to complete measurement within a configured measurement time interval. The L1-SINR may be measured, for example, only on a CMR, without configuring an IMR. FIG. 2 is an example in which L1-SINR is measured without configuring an IMR. As illustrated in FIG. 2, L1-SINR measurement may be performed using a CMR used for L1-RSRP measurement.

FIG. 3 is a diagram illustrating an example (2) of measurement according to an embodiment of the present invention. As illustrated in FIG. 3, in addition to a CMR, an IMR for measuring interference may be used for L1-SINR measurement. Furthermore, as an IMR, either one or both a non-zero power (NZP) CSI-RS and a CSI-Interference measurement (IM) may be configured. In FIG. 3, the CMR and IMR are allocated with the same period. However, a period of a CMR may differ from a period of an IMR.

A measurement period of L1-SINR may be specified as a function using at least one of M, N, and P, where "M" is a number of samples used for measurement of the L1-SINR reporting, "P" is a scaling factor considering an overlap with an SS block based RRM measurement timing configuration (SMTC) or a Measurement gap (MG), and "N" is a scaling factor considering reception beam switching of the terminal 20.

For example, the measurement period of the L1-SINR in FR1 may be defined to be M×P×$T_{SSB}$ Or M×P×$T_{CSI-RS}$, where $T_{SSB}$ is SSB periodicity and $T_{CSI-RS}$ is periodicity of CSI-RS. That is, since it is assumed that a reception beam of the terminal 20 is not switched in FR1, N may be 1 (N=1). In FR2, the measurement period of the L1-SINR may be defined to be M×N×P×$T_{SSB}$ or M×N×P×$T_{CSI-RS}$.

Here, since there is a case in which a CMR and an IMR are required for L1-SINR, a measurement period may be defined based on a number of samples of the CMR and a number of samples of the IMR. For example, when a transmission period of a CMR is 5 ms and a transmission period of an IMR is 20 ms, if a measurement period is determined using only the CMR as a reference, such as a case of the L1-RSRP measurement, measurement accuracy of the IMR may be degraded. Accordingly, in the following, a method of determining a period of measurement of L1-SINR based on a configuration of a CMR, a method of determining a period of measurement of L1-SINR based on a configuration of an IMR, and a method of determining a period of measurement of L1-SINR based on a configuration of a CMR and an IMR are described.

FIG. 4 is a flowchart illustrating the example (1) of the measurement according to an embodiment of the present invention. At step S11, the terminal 20 determines a measurement period based on a configuration of a CMR used for L1-SINR measurement. For example, the terminal 20 may determine a period of measurement of L1-SINR based on a transmission period of a CMR.

At step S12, the terminal 20 executes L1-SINR measurement with the measurement period determined at step S11.

FIG. 5 is a flowchart illustrating the example (2) of the measurement according to an embodiment of the present invention. At step S21, the terminal 20 determines a measurement period based on a configuration of an IMR used for L1-SINR measurement. For example, the terminal 20 may determine a period of measurement of L1-SINR based on a period of multiplexing of an IMR. Furthermore, for example, a period of measurement of L1-SINR may be determined using an IMR with the maximum period of multiplexing, as a reference. Furthermore, for example, a period of measurement of L1-SINR may be determined using an IMR with the minimum period of multiplexing, as a reference. Furthermore, for example, a period of measurement of L1-SINR may be determined using an average value of periods of multiplexing of respective IMRs, as a reference.

At step S22, the terminal 20 executes L1-SINR measurement with the measurement period determined at step S21.

FIG. 6 is a flowchart illustrating an example (3) of measurement according to an embodiment of the present invention. At step S31, the terminal 20 determines a measurement period based on a configuration of a CMR and a configuration of an IMR used for L1-SINR measurement. For example, the terminal 20 may determine a period of measurement of L1-SINR based on a period a CMR and a period of an IMR. Furthermore, for example, a period of measurement of L1-SINR may be determined using the CMR with the maximum period and the IMR with the maximum period, as a reference. Furthermore, for example, a period of measurement of L1-SINR may be determined using the CMR with the minimum period and the IMR with the minimum period, as a reference. Furthermore, for example, a period of measurement of L1-SINR may be determined using an average value of periods of respective CMRs and IMRs, as a reference.

Furthermore, for example, a period of measurement of L1-SINR may be determined based on a number of samples required for achieving desired measurement accuracy. Suppose that a period of a CMR is $P_C$, a period of IMR is $P_I$, a required number of samples of the CMR is $S_C$, and a required number of samples of the IMR is $S_I$. $P_C*S_C$ is compared with $P_I*S_I$. If $P_C*S_C$ is greater than $P_I*S_I$, the period of measurement of L1-SINR may be the measurement period of the CMR. If $P_I*S_I$ is greater than $P_C*S_C$, the period of measurement of L1-SINR may be the measurement period of the IMR. Furthermore, for example, when $P_C$ is large, the period of measurement of L1-SINR may be the measurement period of the CMR. If $P_I$ is large, the period of measurement of L1-SINR may be the measurement period of the IMR.

At step S32, the terminal 20 executes L1-SINR measurement with the measurement period determined at step S31.

According to the above-described embodiments, the terminal 20 can determine a period of measurement of L1-SINR based on a configuration of CMR measurement or a configuration of IMR measurement.

Namely, in a radio communication system, a measurement period for ensuring measurement accuracy can be determined.

(Device Configuration)

Next, an example of a functional configuration of the base station 10 and the terminal 20 for performing the processes and operations described above is described. The base station 10 and terminal 20 include functions for implementing the embodiments described above. However, each of the base stations 10 and the terminal 20 may include only a part of the functions in the embodiments.

<Base Station 10>

Figure 7:
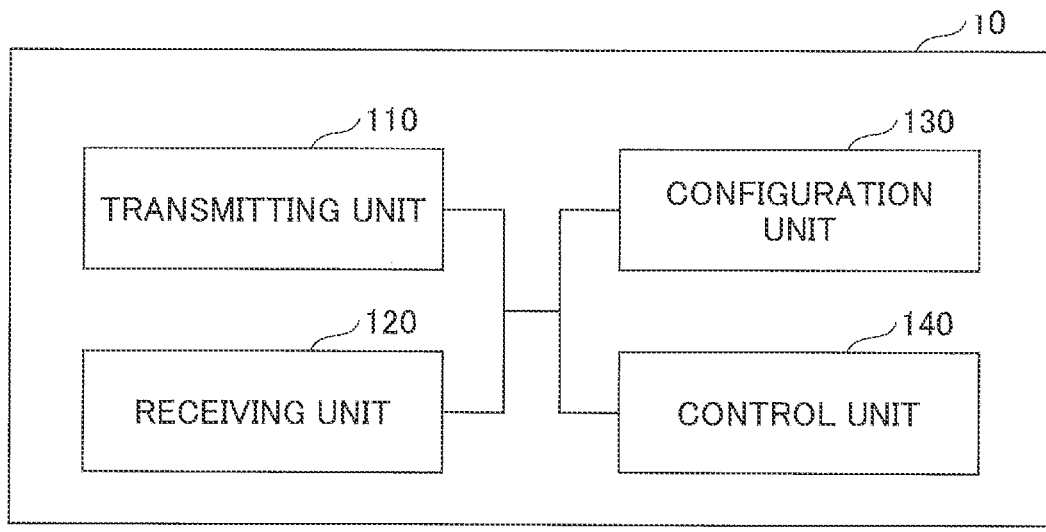
FIG. 7 is a diagram illustrating an example of a functional configuration of a base station 10 according to an embodiment of the present invention.

FIG. 7 is a diagram illustrating an example of a functional configuration of the base station 10 according to an embodiment of the present invention. As illustrated in FIG. 7, the base station 10 includes a transmitting unit 110; a receiving unit 120; a configuration unit 130; and a control unit 140. The functional configuration shown in FIG. 7 is only one example. If the operation according to the embodiments of the present invention can be executed, the functional division and the name of the functional units may be any division and any name.

The transmitting unit 110 includes a function for generating a signal to be transmitted to the terminal 20 and transmitting the signal through radio. The transmitting unit 110 transmits a message between network nodes to the other network nodes. The receiving unit 120 includes a function for receiving various signals transmitted from the terminal 20 and retrieving, for example, information of a higher layer from the received signals. The transmitting unit 110 has a function to transmit NR-PSS, NR-SSS, NR-PBCH, DL/UL control signals, etc., to the terminal 20. The receiving unit 120 receives a message between network nodes from other network nodes.

The configuration unit 130 stores preconfigured configuration information and various types of configuration information to be transmitted to the terminal 20. The content of the configuration information is, for example, information related to measurement of RSRP or SINR of the terminal 20.

As described in the embodiments, the control unit 140 performs control related to measurement of RSRP or SINR of the terminal 20. A functional unit related to signal transmission in the control unit 140 may be included in the transmitting unit 110, and a functional unit related to signal reception in the control unit 140 may be included in the receiving unit 120.

<Terminal 20>

Figure 8:
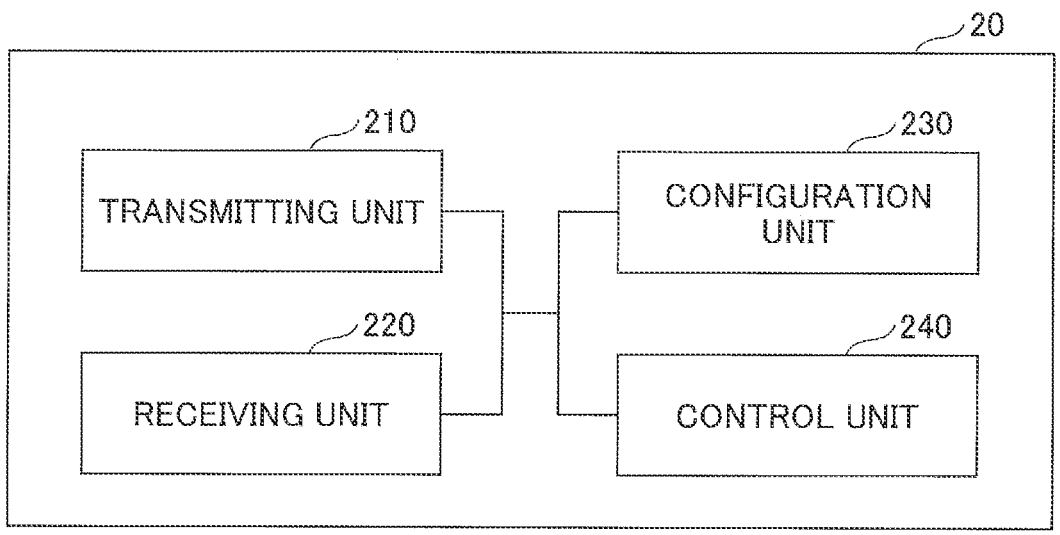
FIG. 8 is a diagram illustrating an example of a functional configuration of a terminal 20 according to an embodiment of the present invention.

FIG. 8 is a diagram illustrating an example of a functional configuration of a terminal 20 according to an embodiment of the present invention. As illustrated in FIG. 8, the terminal 20 includes a transmitting unit 210; a receiving unit 220; a configuration unit 230; and a control unit 240. The functional configuration shown in FIG. 8 is only one example. If the operation according to the embodiments of the present invention can be performed, the functional division and the name of the functional units may be any division and any name.

The transmitting unit 210 creates a transmission signal from transmission data and transmits the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, etc., transmitted from the base station 10. For example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), etc., to the other terminal 20 as D2D communication, and the receiving unit 220 receives PSCCH, PSSCH, PSDCH, PSBCH, etc., from the other terminal 20.

The configuration unit 230 stores various types of configuration information received from the base station 10 by the receiving unit 220. The configuration unit 230 also stores preconfigured configuration information. The content of the configuration information is, for example, information related to measurement of RSRP or measurement of SINR.

The control unit 240 performs control for measurement of RSRP or SINR, as described in the embodiments. A functional unit related to signal transmission in the control unit 240 may be included in the transmitting unit 210, and a functional unit related to signal reception in the control unit 240 may be included in the receiving unit 220.

(Hardware Configuration)

Block diagrams (FIG. 7 and FIG. 8) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 9:
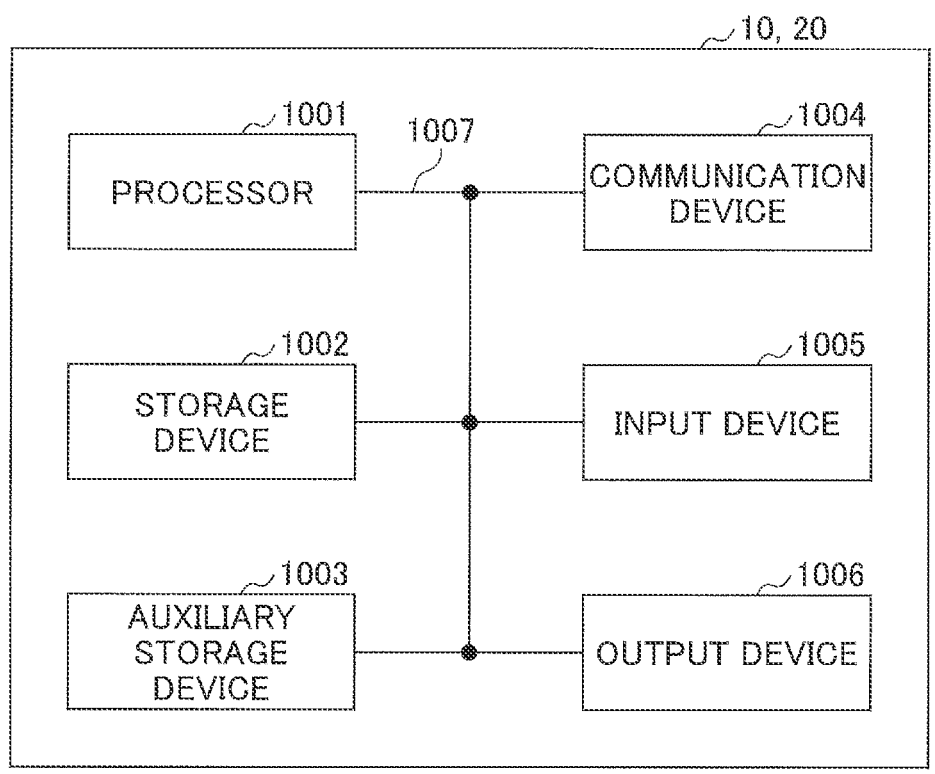
FIG. 9 is a diagram illustrating an example of a hardware configuration of the base station 10 or the terminal 20 according to an embodiment of the present invention.

For example, the base station 10, the terminal 20, etc., according to the embodiments of the present invention may function as a computer that performs processing of the radio communication method according to the present disclosure. FIG. 9 is a diagram illustrating an example of a hardware configuration of the base station 10 and the terminal 20 according to an embodiment of the present disclosure. The base station 10 and the terminal 20 may each be configured as a computer device including, physically, a processor 1001, a storage device 1002, an auxiliary storage device 1003, a communication device 1004, an input device 1005, an output device 1006, a bus 1007, etc.

In the following description, the term "device" can be read as a circuit, a device, a unit, etc. The hardware configuration of the base station 10 and terminal 20 may be configured to include one or more of the devices depicted in the figure, or may be configured without some devices.

Each function of the base station 10 and the terminal 20 is implemented by loading predetermined software (program) on hardware, such as the processor 1001, the storage device 1002, etc., so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-described control unit 140, control unit 240, etc., may be implemented by the processor 1001.

Additionally, the processor 1001 reads a program (program code), a software module, data, etc., from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station 10 illustrated in FIG. 7 may be implemented by a control program that is stored in the storage device 1002 and that is operated by the processor 1001. Furthermore, for example, the control unit 240 of the terminal 20 illustrated in FIG. 8 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), etc. The storage device 1002 may be referred to as a register, a cache, a main memory (main storage device), etc. The storage device 1002 may store a program (program code), a software module, etc., which can be executed for implementing the communication method according to one embodiment of the present disclosure.

The auxiliary storage device 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transmitting/receiving antenna, an amplifier unit, a transceiver unit, a transmission line interface, etc., may be implemented by the communication device 1004. The transceiver unit may be implemented so that the transmitting unit and the receiving unit are physically or logically separated.

The input device 1005 is an input device (e.g., a keyboard, a mouse, a microphone, a switch, a button, or a sensor) that receives an external input. The output device 1006 is an output device (e.g., a display, a speaker, or LED lamp) that performs output toward outside. The input device 1005 and the output device 1006 may be configured to be integrated (e.g., a touch panel).

Each device, such as the processor 1001 and the storage device 1002, is also connected by the bus 1007 for communicating information. The bus 1007 may be formed of a single bus or may be formed of different buses between devices.

The base station 10 and the terminal 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

As described above, according to the embodiments of the present invention, there is provided a terminal including a receiving unit that receives a block and a reference signal that is for measuring a channel state, wherein the block includes a synchronization signal and system information; and a control unit that measures Layer1 Signal to interference plus noise power ratio (L1-SINR) based on the block including the synchronization signal and the system information, the reference signal for measuring the channel state, and measurement using a resource for measuring interference, wherein the control unit determines a period of measurement of the L1-SINR based on a configuration of the resource for measuring the interference.

According to the above-described configuration, the terminal 20 can determine the period of the measurement of the L1-SINR based on the configuration of the CMR measurement or the configuration of the IMR measurement. Namely, in the radio communication system, the measurement period for ensuring the measurement accuracy can be determined.

The control unit may determine the period of the measurement of the L1-SINR based on a period of the measurement using the resource for measuring the interference. According to this configuration, the terminal 20 can determine the period of the measurement of the L1-SINR based on the configuration of the IMR measurement.

When a plurality of resources for measuring the interference is configured, the control unit may determine the period of the measurement of the L1-SINR based on a minimum measurement period among periods of the measurement using the plurality of resources for measuring the interference. According to this configuration, the terminal 20 can determine the period of the measurement of the L1-SINR based on the configuration of the IMR measurement.

The control unit may determine the period of the measurement of the L1-SINR based on: a configuration of the block including the synchronization signal and the system information or a configuration of the reference signal for measuring the channel state; and the configuration of the resource for measuring the interference. According to this configuration, the terminal 20 can determine the period of the measurement of the L1-SINR based on the configuration of the CMR measurement and the configuration of the IMR measurement.

The control unit may determine the period of the measurement of the L1-SINR based on: a period and a required number of samples of the block including the synchronization signal and the system information or a period and a required number of samples of the reference signal for measuring the channel state; and a period and a required number of samples of the resource for measuring the interference. According to this configuration, the terminal 20 can determine the period of the measurement of the L1-SINR based on the configuration of the CMR measurement and the configuration of the IMR measurement.

Furthermore, according to the embodiments of the present invention, there is provided a measurement method in which a terminal executes: a receiving step of receiving a block and a reference signal that is for measuring a channel state, wherein the block includes a synchronization signal and system information; and a control step of measuring Layer1 Signal to interference plus noise power ratio (L1-SINR) based on the block including the synchronization signal and the system information, the reference signal for measuring the channel state, and measurement using a resource for measuring interference, wherein the control step includes a step of determining a period of measurement of the L1-SINR based on a configuration of the resource for measuring the interference.

According to the above-described configuration, the terminal 20 can determine the period of the measurement of the L1-SINR based on the configuration of the CMR measurement or the configuration of the IMR measurement. Namely, in the radio communication system, the measurement period for ensuring the measurement accuracy can be determined.

Supplemental Embodiments

While the embodiments of the present invention are described above, the disclosed invention is not limited to the embodiments, and those skilled in the art will appreciate various alterations, modifications, alternatives, substitutions, etc. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the base station 10 and the terminal 20 are described using functional block diagrams, but such devices may be implemented in hardware, software, or a combination thereof. Software operated by a processor included in the base station 10 in accordance with embodiments of the present invention and software operated by a processor included in the terminal 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signalling (e.g., Downlink Control Information (DCI), Uplink Control Information (UCI), higher layer signalling (e.g., Radio Resource Control (RRC) signalling, Medium Access Control (MAC) signalling, broadcast information (Master Information Block (MIB), System Information Block (SIB))), or other signals or combinations thereof. RRC signalling may be referred to as an RRC message, for example, which may be an RRC connection setup message, an RRC connection reconfiguration message, etc.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, etc. of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by base station 10 may be performed by an upper node in some cases. It is apparent that in a network consisting of one or more network nodes having base stations 10, various operations performed for communicating with the terminal 20 may be performed by at least one of the base stations 10 and network nodes other than the base stations 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, etc.

Software, instructions, information, etc., may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared, microwave, etc.), at least one of these wireline technology and wireless technology is included within the definition of a transmission medium.

The information, signals, etc., described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signalling). The signal may also be a message. The component carrier may also be referred to as a carrier frequency, cell, frequency carrier, etc.

As used in this disclosure, the terms "system" and "network" are used interchangeably.

The information, parameters, etc., described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," etc., may be used interchangeably. The base stations may be referred to in terms such as macro-cell, small-cell, femto-cell, pico-cell, etc.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station or a remote Radio Head (RRH)). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", etc., may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, etc. At least one of a base station and a mobile station may be a device installed in a mobile body, a mobile body itself, etc. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals 20 (e.g., may be referred to as Device-to-Device (D2D), Vehicle-to-Everything (V2X)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, etc., may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be read as "assuming," "expected," "considering," etc.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," etc.

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, etc.

A slot may be formed of, in a time domain, one or more symbols (Orthogonal Frequency Division Multiplexing (OFDM) symbols, Single Carrier Frequency Division Multiple Access (SC-FDMA) symbols, etc.). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, etc., instead of a subframe.

Here, the TTI refers to, for example, the minimum time unit of scheduling in radio communication. For example, in the LTE system, the base station performs scheduling for allocating radio resources (such as a frequency bandwidth, transmission power, etc., that can be used in each terminal 20) in units of TTIs to each terminal 20. Note that the definition of the TTI is not limited to this.

The TTI may be a transmission time unit, such as a channel coded data packet (transport block), a code block, a codeword, etc., or may be a processing unit for scheduling, link adaptation, etc. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, etc. A TTI that is shorter than a normal TTI may be referred to as a shortened TTI, a short TTI, a partial TTI (partial TTI or fractional TTI), a shortened subframe, a short subframe, a mini-slot, a sub-slot, a slot, etc.

Note that a long TTI (e.g., a normal TTI or a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, etc.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth, etc.) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," etc. in the present disclosure may be replaced with "BWP."

The structures of the above-described radio frame, subframe, slot, mini-slot, symbol, etc., are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, etc., within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," etc., may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Note that, in the present disclosure, an SSB is an example of a block including a synchronization signal and system information. A CSI-RS is an example of a reference signal for measuring a channel state.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

This international patent application is based on and claims priority to Japanese Patent Application No. 2019-

189518 filed on Oct. 16, 2019, and the entire content of Japanese Patent Application No. 2019-189518 is incorporated herein by reference.

LIST OF REFERENCE SYMBOLS 10 base station
110 transmitting unit
120 receiving unit
130 configuration unit
140 control unit
20 terminal
210 transmitting unit
220 receiving unit
230 configuration unit
240 control unit
1001 processor
1002 storage device
1003 auxiliary storage device
1004 communication device
1005 input device
1006 output device

The invention claimed is:

1. A terminal comprising:
a receiver that receives a synchronization signal and a reference signal for channel state information; and
a processor that performs, based on a resource for measuring a channel state and a resource for measuring interference, a measurement of a Layer1 Signal to interference plus noise power ratio (L1-SINR) that uses the synchronization signal and the reference signal,
wherein the processor determines a period of the measurement of the L1-SINR based on a larger measurement period of a measurement period for the resource for measuring the channel state and a measurement period for the resource for measuring the interference, and
wherein the processor determines the period of the measurement of the L1-SINR in Frequency Range 2 based on a value obtained by multiplying the larger measurement period by an integer value.

2. A communication system comprising:
a base station; and
a terminal,
wherein the base station includes:
a transmitter that transmits, to the terminal, a synchronization signal and a reference signal for channel state information, and
wherein the terminal includes:
a receiver that receives, from the base station, the synchronization signal and the reference signal; and
a processor that performs, based on a resource for measuring a channel state and a resource for measuring interference, a measurement of a Layer1 Signal to interference plus noise power ratio (L1-SINR) that uses the synchronization signal and the reference signal,
wherein the processor determines a period of the measurement of the L1-SINR based on a larger measurement period of a measurement period for the resource for measuring the channel state and a measurement period for the resource for measuring the interference, and
wherein the processor determines the period of the measurement of the L1-SINR in Frequency Range 2 based on a value obtained by multiplying the larger measurement period by an integer value.

3. A communication method executed by a terminal, the method comprising:
receiving a synchronization signal and a reference signal for channel state information;
performing, based on a resource for measuring a channel state and a resource for measuring interference, a measurement of a Layer1 Signal to interference plus noise power ratio (L1-SINR) that uses the synchronization signal and the reference signal;
determining a period of the measurement of the L1-SINR based on a larger measurement period of a measurement period for the resource for measuring the channel state and a measurement period for the resource for measuring the interference; and
determining the period of the measurement of the L1-SINR in Frequency Range 2 based on a value obtained by multiplying the larger measurement period by an integer value.

* * * * *